United States Patent [19]

Meyers et al.

[11] Patent Number: 5,011,122

[45] Date of Patent: * Apr. 30, 1991

[54] RESILIENT TORSION ARRANGEMENT

[75] Inventors: Frank Meyers, 317 Calle Mayor, Redondo Beach, Calif. 90277; Lawrence L. Rutstrom, Torrance, Calif.

[73] Assignee: Frank Meyers, Redondo Beach, Calif.

[*] Notice: The portion of the term of this patent subsequent to Aug. 30, 2006 has been disclaimed.

[21] Appl. No.: 410,854

[22] Filed: Aug. 23, 1982

[51] Int. Cl.$^5$ ............................................. F16F 1/14
[52] U.S. Cl. .................................. 267/154; 267/107; 267/109; 267/273
[58] Field of Search ............... 267/154, 155, 156, 157, 267/159, 160, 107, 108, 273, 275, 103, 104, 105, 106, 109, 151; 441/90; 5/255

[56] References Cited

U.S. PATENT DOCUMENTS

| 3,584 | 5/1844 | De Liencourt | 441/90 |
| 167,877 | 9/1875 | Devendorf | 267/57 |
| 466,538 | 1/1892 | Heilrath | 267/58 |
| 1,787,786 | 1/1931 | Jerome | 267/155 X |
| 2,527,605 | 10/1950 | Walk | 267/155 |

FOREIGN PATENT DOCUMENTS 4252 of 1894 United Kingdom ................. 267/58

OTHER PUBLICATIONS

*The American Heritage Dictionary*, 2nd College Ed., (Boston: Houghton Mifflin Company, 1982), p. 1280.

Primary Examiner—George E. A. Halvosa
Attorney, Agent, or Firm—Ladas & Parry

[57] ABSTRACT

An improved resilient torsion arrangement. The torsion arrangement is comprised of a wire-like body member having an upper portion formed in a first predetermined open geometrical configuration, a transverse portion extending across the first predetermined open geometrical configuration, and a lower portion having a second predetermined open geometrical configuration. The upper portion and the lower portion are resiliently movable toward, or away from, each other to put the transverse portion into torsion. The torsion in the transverse portion provides the resilient force resisting movement of the upper portion toward the lower portion. Proper selection of the relationships between the upper portion and the lower portion and configuration of the transverse portion can provide predetermined relationships between the force required to move the upper portion toward, and away from, the lower portion and the separation between the upper portion and the lower portion.

32 Claims, 8 Drawing Sheets

H = 15 inches
$h_1$ = 7 1/4 inches
$h_2$ = 7 1/2 inches
$l_1$ = 8 1/8 inches
$l_2$ = 8 inches
A = 135°
B = 133°

H = 20 1/4 inches
$h_1$ = 9 3/4 inches
$h_2$ = 9 1/2 inches
$l_1$ = 10 3/8 inches
$l_2$ = 10 3/8 inches
A = 135°
B = 144°

$$p = F\cos\theta$$
$$q = F\sin\theta$$

$$\delta_Q = \frac{QR^3}{2EI}\left[.754 - .656\left(\frac{.363}{1+\frac{L}{7.23R}}\right)\right]$$

$$\delta_P = \frac{PR^3}{2EI}\left[.356 - .571\left(\frac{.363}{1+\frac{L}{4\pi R}}\right)\right]$$

$$F = \frac{2GJ(\theta - \theta_0)}{RL \sin \theta}$$

FIG. 11

| SYMBOL | EXPLANATION |
|---|---|
| $\delta p$ | IN-PLANE DEFLECTION — INCHES |
| $\delta q$ | OUT-OF-PLANE DEFLECTION — INCHES |
| $\Delta$ | TOTAL DEFLECTION FOR EACH HALF RING — INCHES |
| E | MODULUS OF ELASTICITY — PSI ($30 \cdot 10^6$ FOR STEEL) |
| F | FORCE ON RING — POUNDS |
| G | SHEAR MODULUS — PSI ($11.5 \cdot 10^6$ FOR STEEL) |
| I | PLANAR MOMENT OF INERTIA — $IN^4$ ($\frac{\pi d^4}{64}$ FOR ROUND) |
| J | POLAR MOMENT OF INERTIA — $IN^4$ ($\frac{\pi d^4}{32}$ FOR ROUND) |
| L | LENGTH OF STRAIGHT SECTION — INCHES |
| P | PLANAR COMPONENT OF FORCE F — POUNDS |
| Q | ROTATIONAL DEFLECTION OF RING PLANE — (RADIANS) |
| R | RING RADIUS — INCHES |
| $\theta$ | ROTATIONAL DEFLECTION OF RING PLANE — (RADIANS) |
| $\theta_0$ | INITIAL RING PLANE POSITION — RADIANS |
| T | TORQUE ON STRAIGHT SECTIONS OF WIRE — IN-LB |

FIG. 12

$$K_\theta = \frac{2GJ}{L}$$

$$\frac{FR}{K} = \frac{\theta - \theta_0}{\sin \theta}$$

$$\frac{\Delta}{R} = 1 - \cos \theta$$

FR/K

| $\theta_0$ | | -.013° | -.35° | -1.72° | -5.12° | -12.3° | -26.83° | -57.88° | -138.8° |
|---|---|---|---|---|---|---|---|---|---|
| $\theta$ | $\Delta/R$ | | | | | | | | |
| 5 | .004 | 1.004 | 1.072 | 1.345 | 2.027 | 3.464 | 6.374 | 12.59 | 28.86 |
| 10 | .015 | 1.006 | 1.041 | 1.178 | 1.520 | 2.241 | 3.702 | 6.822 | 14.96 |
| 15 | .034 | 1.012 | 1.035 | 1.127 | 1.357 | 1.841 | 2.821 | 4.914 | 10.37 |
| 25 | .094 | 1.033 | 1.047 | 1.103 | 1.244 | 1.540 | 2.140 | 3.423 | 6.766 |
| 35 | .181 | 1.065 | 1.076 | 1.117 | 1.221 | 1.439 | 1.881 | 2.826 | 5.296 |
| 45 | .293 | 1.111 | 1.119 | 1.153 | 1.237 | 1.414 | 1.773 | 2.539 | 4.538 |
| 55 | .426 | 1.172 | 1.179 | 1.208 | 1.281 | 1.434 | 1.743 | 2.405 | 4.129 |
| 65 | .577 | 1.252 | 1.258 | 1.285 | 1.350 | 1.489 | 1.768 | 2.366 | 3.925 |
| 75 | .741 | 1.355 | 1.361 | 1.386 | 1.448 | 1.577 | 1.840 | 2.401 | 3.863 |
| 80 | .826 | 1.418 | 1.424 | 1.448 | 1.508 | 1.637 | 1.893 | 2.443 | 3.878 |
| 85 | .913 | 1.489 | 1.495 | 1.519 | 1.579 | 1.705 | 1.959 | 2.503 | 3.921 |
| 90 | 1.000 | 1.571 | 1.577 | 1.601 | 1.660 | 1.785 | 2.039 | 2.581 | 3.994 |

RESILIENT TORSION ARRANGEMENT

BACKGROUND OF THE INVENTION

1. Field of the Invention

This invention relates to the resilient art, and, more particularly, to an arrangement providing the resilient resistance to movement provided by torsion in a portion of the arrangement.

2. Description of the Prior Art

In many applications, resilient arrangements for resisting deformation are required. Such resilient arrangements have often been provided by various types of springs such as coil springs, leaf springs, and the like. Additionally, certain types of torsion bar structures have been utilized, for example, in automobile suspensions and the like. However, there has long been a need for a resilient arrangement in which, for a given geometry of the arrangement, the force required to move one portion of the spring toward (or away from, depending on the application) another may be selected over a wide range of relationships. In particular, in certain applications it may be desirable to have this relationship be such that, once a predetermined force is exceeded, one portion of the torsion arrangement will move toward another portion of the torsion arrangement resiliently, without further substantial increase in the force, thus providing a comparatively flat force-deflection relationship. Other arrangements desired may include those wherein the force required additionally decreases until one portion of the torsion arrangement is at a predetermined separation from another portion of the torsion arrangement and then the force increases for further movement of one portion of the torsion arrangement toward the other. The point at which the force commences to increase is generally termed an inflection point and torsion arrangements in which the inflection point may be selected for a given configuration of the torsion arrangement to be at any desired separation between one portion and the other portion of the torsion arrangement, are often desired. Similarly, such arrangements often are desired in which the rate of change of the force-deflection curve may be preselected.

Such resilient arrangements as above described are often desired in such diverse applications as hinges to provide positive opening or closing of the structures to which the hinges are attached; collapsible lifeboats to provide automatic opening thereof without the requirement for a positive air pressure to maintain buoyancy; oil containment booms to provide automatic opening thereof without the requirement of positive pressure to maintain buoyancy; and numerous other applications, for example, cushioning arrangements, shock mounts, or other applications. Thus, the invention described herein may be utilized in any desired application where the characteristics of the particular improved torsion arrangement as described herein may be advantageously utilized. Thus, invention herein is not limited to application to a particular embodiment, but may be generally utilized where desired.

SUMMARY OF THE INVENTION

Accordingly, it is an object of the present invention to provide an improved resilient arrangement.

It is another object of the present invention to provide an improved resilient arrangement wherein the resiliency is provided by torsional stresses imposed on part of the arrangement.

It is yet another object of the present invention to provide an improved resilient torsion arrangement wherein a variety of force-deflection arrangements may be provided for a particular torsion arrangement configuration.

The above, and other objects of the present invention are achieved according to a preferred embodiment thereof, by providing a wire-like body member which may be formed into a predetermined configuration. For example, where the application of the resilient torsion arrangement of the present invention is for an inflatable oil containment boom, the torsion arrangement of the present invention may be positioned within the tubular flotation portion of such an oil containment boom to provide a resilient, automatic opening thereof to its buoyant configuration and yet allow compact closing thereof for convenient storage. In such an embodiment, the torsion arrangement formed by the wire-like body member is formed into an upper portion having a first predetermined open geometrical configuration and the first predetermined open geometrical configuration in this embodiment may be, for example, semi-circular or any other desired configuration for the upper portion of the oil containment boom. The body member has a transverse portion extending across the first predetermined open geometrical configuration, and a lower portion having a second predetermined open geometrical configuration which may be the same or different from the first predetermined open geometrical configuration of the upper portion. The upper portion is resiliently movable toward the lower portion to put the transverse portion into torsion. In the embodiments of the present invention wherein the wire-like body member is formed from a single wire-like segment, each end of the wire-like body member may be restrained at a particular location with respect to the transverse portion, and, for example, may be on the transverse portion at spaced-apart locations thereon. The first predetermined open geometrical configuration and second predetermined open geometrical configuration of the body member are selected to provide the desired geometrical configuration of the flotation portion of the boom. Restraining means are coupled to the tube-like boom member to restrain the body member at a predetermined position within the tube-like body member of the oil containment boom.

According to the principles of the present invention, it has been discovered that for a given wire material, wire diameter, and configuration of the various portions of the body member, the force-deflection characteristics of the wire-like body member may be varied by varying certain parameters.

The wire-like body member may be considered to have a planar position, wherein the upper portion, the transverse portion, and the lower portion are substantially co-planar. It will be appreciated, of course, that parts of the upper or lower portions, or both, of the body member may not be in such a plane. Such configurations are also included herein within the definition of the planar position. However, when the wire-like body member is formed, the angular relationship between the upper portion and the lower portion may be selected as desired, and this is the initial configuration of the wire-like body member. In the initial configuration, there is substantially no torsional force or other force on the wire-like body member. When the wire-like body member is installed into the structure in which it is to be utilized, for example, the oil containment boom as described above, the wire-like body member may be "preloaded" by providing an installed position wherein the angular relationship between the upper portion and the lower portion is different from the initial angular relationship therebetween. By proper selection of the angular relationships associated with the initial position and the installed position, the force-deflection relationship of the wire-like body member may be conveniently selected as desired. Thus, for example, the relationship may be selected to be any of a large number of desired relationships.

BRIEF DESCRIPTION OF THE DRAWING

The above and other embodiments of the present invention may be more fully understood from the following detailed description, taken together with the accompanying drawing wherein similar reference characters refer to similar elements throughout, and in which:

FIG. 11 is an equation, showing the relationship between various characteristics of the present invention as illustrated in the structure of FIG. 8;

FIG. 12 is a tabular representation of the symbols utilized in the equations herein;

DESCRIPTION OF THE PREFERRED EMBODIMENTS

Figure 1:
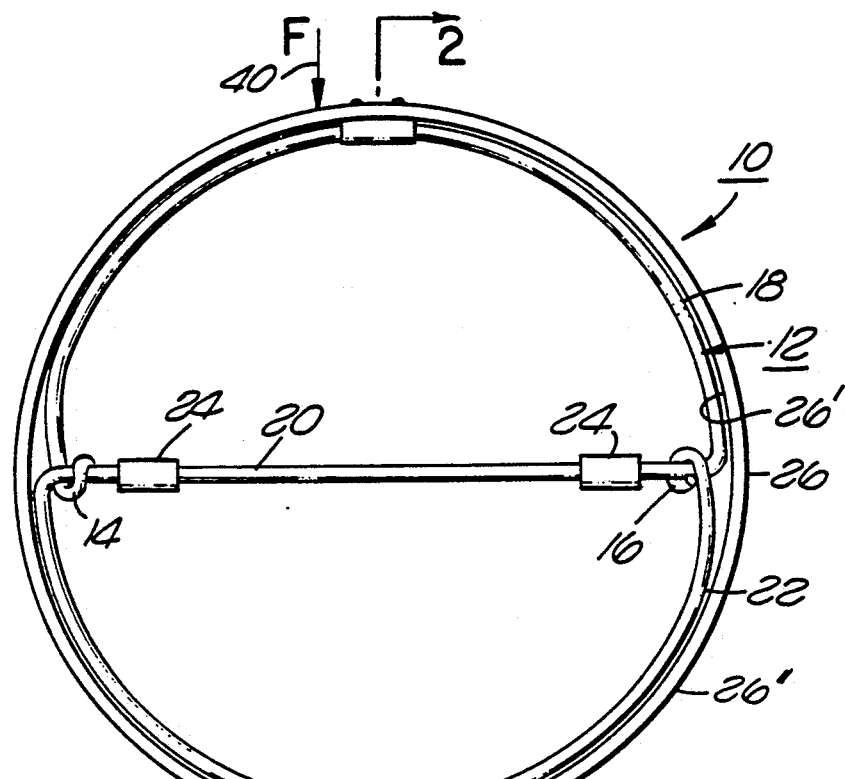
FIG. 1 illustrates one embodiment of the present invention.
Figure 2:
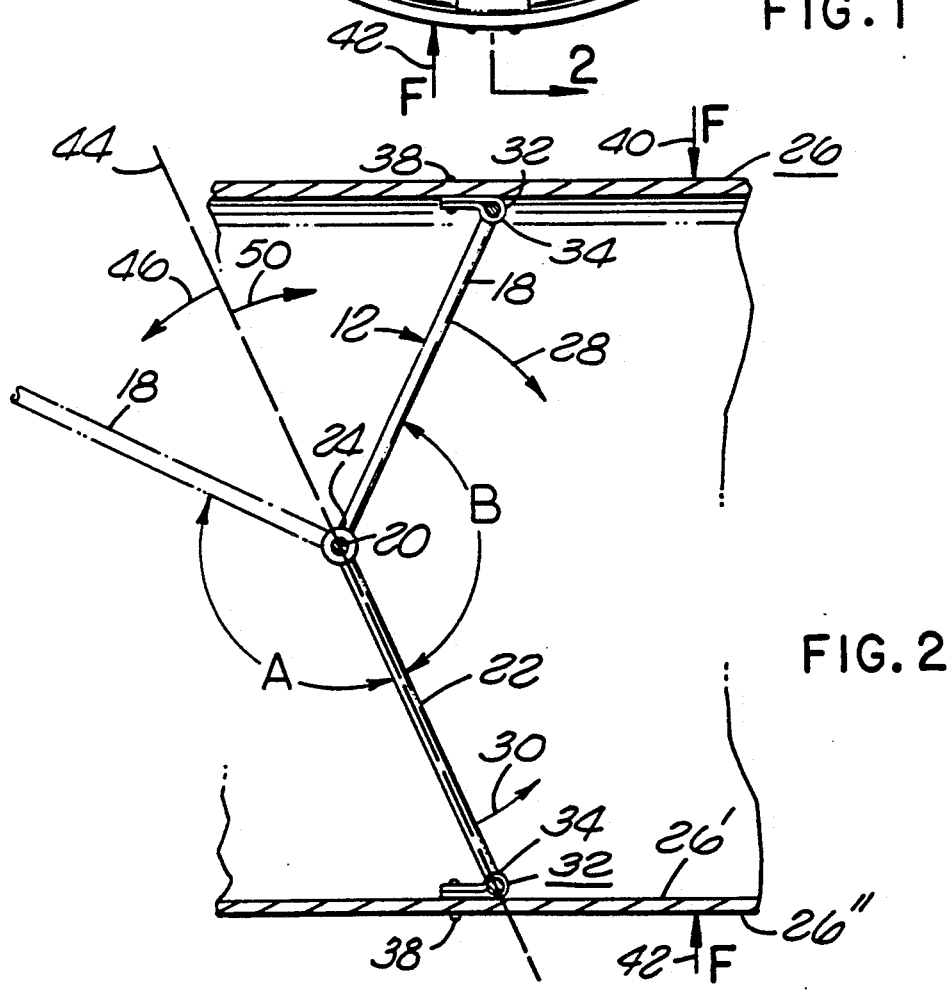
FIG. 2 is a sectional view along the line 2—2 of FIG. 1.

Referring now to the drawing, there is illustrated in FIGS. 1 and 2 an embodiment of the present invention generally designated 10. As illustrated therein, there is provided a resilient torsion arrangement in which there is a wire-like body member 12 having a first end 14, and a second end 16. The wire-like body member is continuous between the first end 14 and the second end 16, and has an elongated length therebetween. The wire-like body member is formed to define an upper portion 18 having a first predetermined open geometrical configuration. As illustrated in FIG. 1, this first predetermined open geometrical configuration is approximately semi-circular in embodiment 10. The wire-like body member 12 also has a transverse portion 20 extending across the first predetermined open geometrical configuration of the upper portion 18, and, accordingly, is approximately a diameter thereof.

The wire-like body member 12 also has a lower portion 22 formed in a second predetermined open geometrical configuration, and, in the embodiment 10, the second predetermined open configuration of the lower portion 22 is also semi-circular and approximately the same as the first predetermined open geometrical configuration of the upper portion 18.

The first end 14 and second end 16 are restrained at a preselected location with respect to, for example, the transverse portion 20. In the embodiment 10, shown in FIG. 1, the first end and second end are restrained at the transverse portion 20 in a spaced-apart location. Thus, restraining means generally designated 24, which, for example, may be crimped on sleeves, are crimped onto the transverse portion 20 to restrain the first end 14 and second end 16 in the spaced-apart relationship. However, it has been found that the first end 14 and second end 16 may, for example, be positioned adjacent each other at any desired location on the transverse member 20. In such embodiments, the first open geometrical configuration of the upper portion 18, therefore, may be different from the second open geometrical configuration of the lower portion 22.

As shown in FIGS. 1 and 2, the embodiment 10 is positioned within a flexible tubular member 26, which, for example, may be the buoyancy chamber of a collapsible lifeboat, the buoyancy portion of an oil containment barrier boom, or any other desired structure where it is desired to maintain the flexible tubular member 26 in an open configuration as shown in FIGS. 1 and 2, under the influence of the body member 12, and resiliently resist movement of the upper portion 18 of the body member 12 toward the lower portion 22, as illustrated by the arrows 28 and 30. The body member 12 is secured to the flexible tubular member 26 by restraining means 32. The restraining means 32 may be substantially similar and comprise straps 34 coupled to the flexible tubular member 26 by, for example, rivets 38. The straps 32 define a pocket through which the upper portion 18 and lower portion 22 project and are thus restrained at these two locations, as illustrated in FIGS. 1 and 2, with respect to the flexible tubular member 26. As shown particularly in FIG. 1, the body member 12 is restrained by the restraining means 32 so that the upper portion 18 and lower portion 22 are adjacent the inner wall surfaces 26' of the flexible tubular member 26.

When a force F is applied to the flexible tubular member 26, in the directions indicated by the arrows 40 and 42, there is relative rotation of the upper portion 18 and lower portion 22 of the body member 12 about the transverse portion 20. Such relative rotation subjects the transverse portion 20 to torsion and the torsional forces on the transverse portion 20 resiliently resist the force F. As described below in greater detail, the relationship between the relative movement between the upper portion 18 and lower portion 22 of the body member 12 and the force F may be selected according to the principles of the present invention to provide virtually any desired relationship.

As illustrated particularly in FIG. 2, the body member 12 has a planar position wherein the upper portion 18, lower portion 22, and transverse portion 24, are substantially co-planar, as illustrated by the dashed line 44. In the embodiment 10, the body member 12 is initially formed where the upper portion 18 has a predetermined relationship to the lower portion 22 in which the transverse portion 20 is substantially free of torsional forces. This position is indicated by the dash-dot line showing of upper portion 18 on FIG. 2. As can be seen, this initial position of the upper portion 18 with respect to the lower portion 22, is different from the planar position illustrated by the dashed line 44, and in this initial position, the upper portion 18 is rotated a predetermined number of degrees from the plane defining the planar position illustrated by the dashed line 44 in a first direction as illustrated by the arrow 46. FIGS. 1 and 2 illustrate the body member 12 in solid lines in its installed position. In the installed position, the upper portion 18 of the body member 12 may be considered to have been rotated about the transverse portion 20 a second predetermined number of degrees toward the lower portion 22 in a second direction illustrated by the arrow 50 opposite the first direction illustrated by the arrow 46 from the planar position illustrated by the dashed line 44. Relative rotation of the upper portion 18 from the initial position shown by the dash-dot line on FIG. 2 to the installed position illustrated by the solid line shown in FIG. 2 toward the lower portion 22, puts the transverse portion 20 into torsion and thus provides a resilient force in the installed position resisting deformation of the tubular member 26 with a predetermined force. As described below in greater detail, the relationship between the initial position and the installed position may be selected to provide desired force-deflection characteristics.

Figure 3:
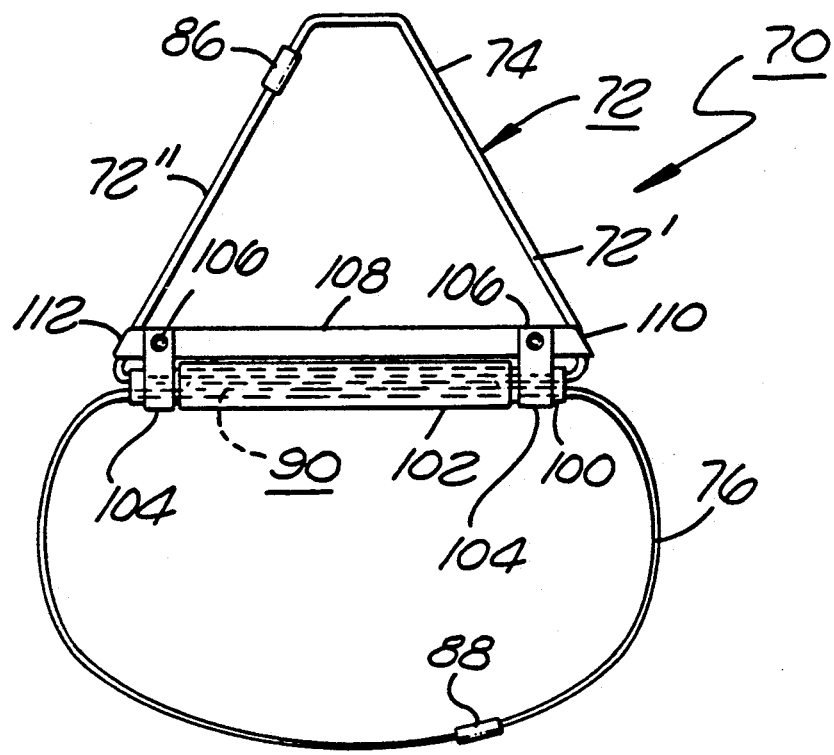
FIG. 3 illustrates another embodiment of the present invention.

FIG. 3 illustrates another embodiment of the present invention generally designated 70. In the embodiment 70, the body member 72 is generally comprises of two separate body sections 72' and 72".

Figure 4:
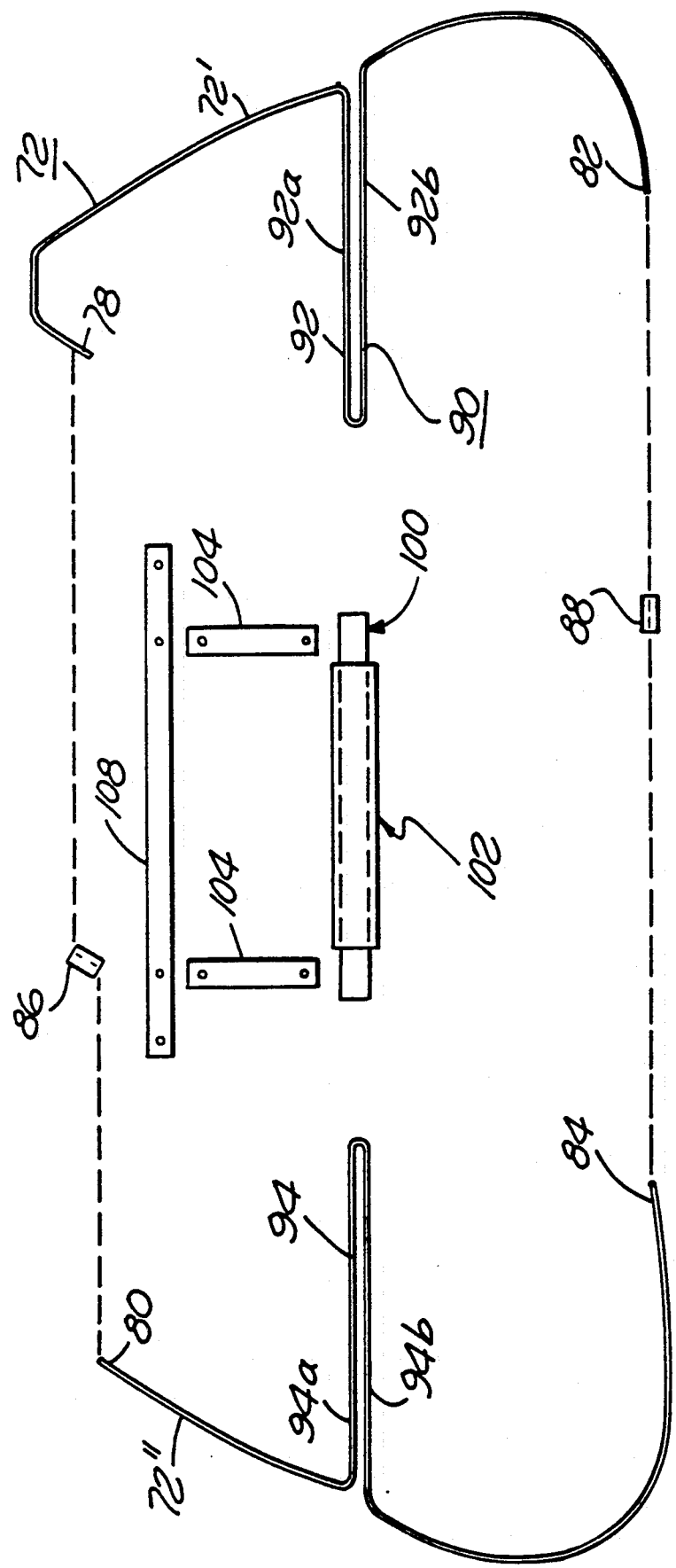
FIG. 4 is an exploded view of the embodiment shown in FIG. 3.

As can be seen from FIGS. 3 and 4, the upper portion 74 of the body member 72 has a different configuration than the lower portion 76 thereof. Thus, the lower portion 76 is somewhat oval in shape and the upper portion 74 is somewhat triangular in shape. It has been found that such a configuration is particularly useful for buoyancy chambers in that it provides a larger displacement for a given submersion depth by the lower portion 76 and a higher freeboard by the upper portion 74. Such buoyancy chambers, of course, might be those as utilized in collapsible lifeboats, oil containment barrier booms, or the like. The first body section 72' and the second body section 72" each have first ends 78 and 80, respectively, and second ends 82 and 84, respectively. The first ends 78 and 80, of the first body section 72' and second body section 72", may be joined together by a crimped on sleeve means 86, and, as shown in FIGS. 3 and 4, the location may be any desired location such as on the upper portion 72. Similarly, the lower ends 82 and 84 of the first body section 72' and second body section 72", may be similarly joined together by a crimped on sleeve 88 which may be similar to the crimped on sleeve 86, and, for example, may be located in the lower portion 76. In the embodiment 70, the transverse portion generally designated 90 is comprised of portions 92 of the first body section 72' and 94 of the second body section 72". Thus, each of the transverse portions 92 and 94 have two transverse portion members 92a and 92b and 94a and 94b. It will be appreciated that multiple U-shaped portions could be utilized for each of the body sections 72' and 72" to provide any desired number of torsion members such as 94a, 94b, 92a, and 92b.

However, with the embodiment 70, as can be seen from FIGS. 3 and 4, the U-shaped torsion members 92 and 94, when assembled as illustrated in FIG. 3, have their closed ends oppositely disposed. Additionally, it has been found that it is desirable to restrain the movement of the torsion portions 92 and 94. As such, a loosely fitting polyethylene tube 100 may be positioned to enclose the portions 92 and 94, and a more rigid aluminum tube 102 may be positioned over the polyethylene tube 100 for greater restraint. Additionally, flexible straps 104 may be utilized to aid in the restraint of the transverse portion 90 and the straps 104 may engage the tube 100 and be connected, for example by rivets 106, to a transverse strap 108 which also connects to the upper portion 74 as indicated at 110 and 112, and restrained in such a position by the rivets 106.

Figure 5:
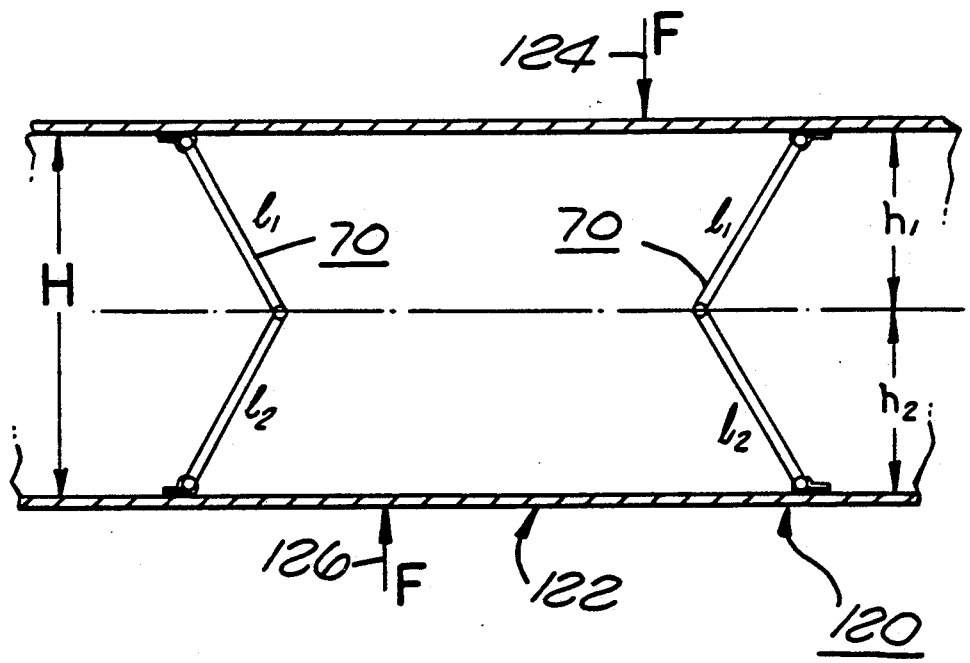
FIG. 5 is a semi-diagrammatic representation of an application of the present invention.
Figure 6:
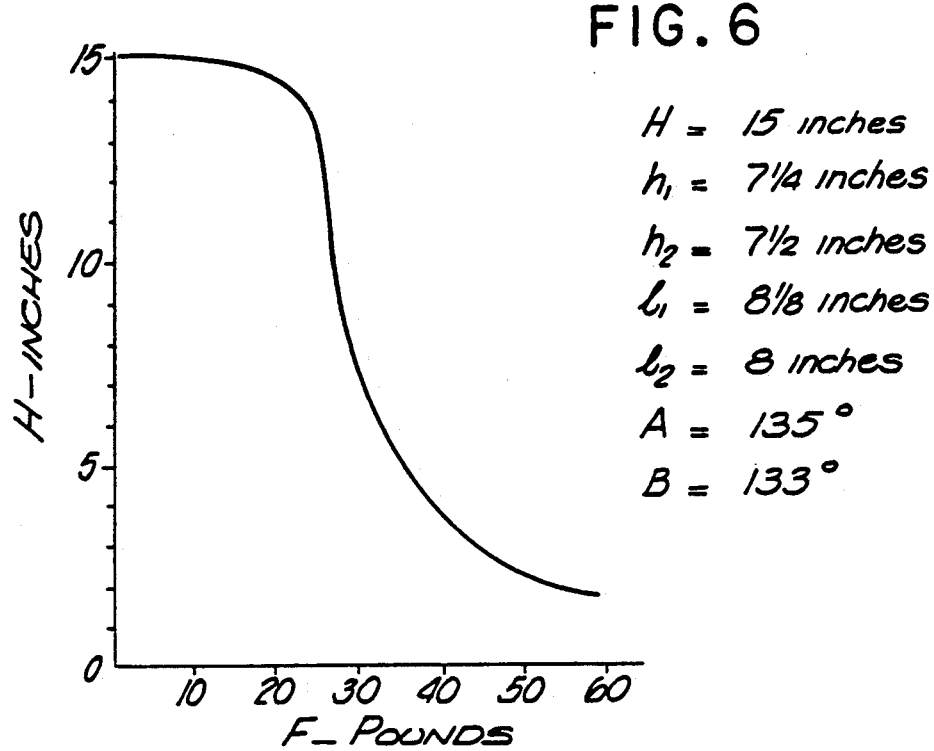
FIG. 6 and FIG. 7 are graphical representations of various characteristics associated with embodiments as illustrated in FIG. 5.
Figure 7:
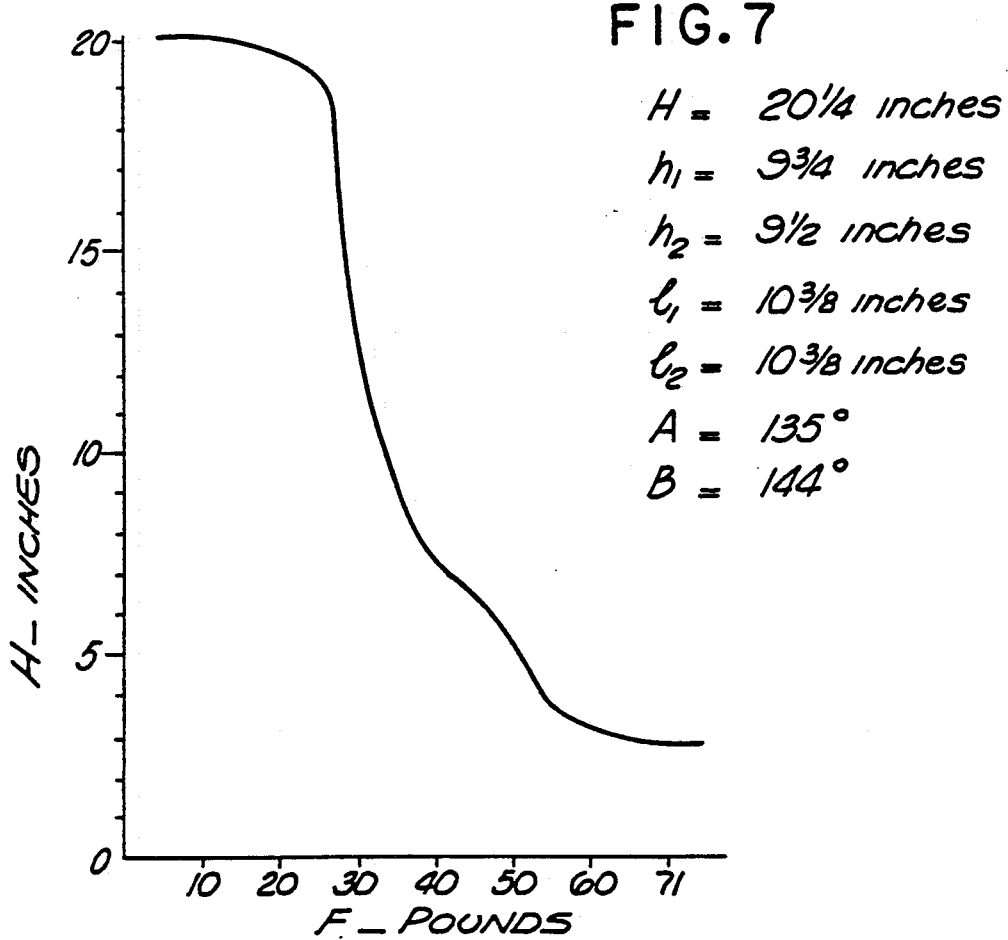

FIG. 5 is a semi-diagrammatic representation of an oil containment barrier boom generally designated 120, in which resilient torsion arrangements such as that illustrated in embodiment 70, are provided to restrain the flexible tubular member 122 of the oil containment barrier boom 120 in the open position to resiliently resist the forces F illustrated by the arrows 124 and 126. Testing has been done on several configurations of the embodiment 120 and FIGS. 6 and 7 illustrate the relationship between the height H as shown on FIG. 5, and the force F. The angles A and B are as illustrated in FIG. 2, wherein A indicates the initial position of the body member 72, that is the angular relationship between the upper portion 74 and 76 therebetween as shown on FIG. 2 in a first direction indicated by the arrow 46 from the planar position illustrated by the dashed line 44. Angle B is the angular relationship between the upper portion 74 and the lower portion 76 in the installed position which is in a second direction illustrated by the arrow 50 in FIG. 2 opposite the first direction illustrated by the arrow 46 in FIG. 2 from the planar position illustrated by the dashed line 44. In the testing, the flexible tubular member 122 was polyethylene having approximately a 0.060 inch wall thickness. For the particular configuration illustrated by the curve of FIG. 6, the body member 72 was formed of 302 stainless steel full hard wire, having a diameter of 0.156 inches. For the curve of FIG. 7, the flexible tubular member 122 was also polyethylene, having a wall thickness of approximately 0.060 inches, and the wire forming the body member 72 was 302 stainless steel full hard wire, having a 0.187 inch diameter. As can be seen from the curves of FIGS. 6 and 7, forces F imposed on the embodiment 120 up to approximately 25 pounds, resulted in comparatively little vertical deformation of the flexible tubular body member 122. However, when this value was exceeded, comparatively small increases in the force caused a very large deformation, that is a collapse of the flexible tubular member 122, until a comparatively large deformation was reached, at which time, once again, comparatively large forces were required for any further deformation. Such a characteristic is desirable, for example, in collapsible inflatable lifeboats, oil containment barrier booms, or the like, as deformation will be resisted by anticipated normal operating forces such as wave action or the like, but the structure may be configured so that when larger forces are applied, rather large deformation, with comparatively small increase in force may be applied to allow compaction and therefore convenient storing of such structures.

It has been found that the total deflection of the improved torsion arrangement of the present invention is generally comprised of three components:
1. In-plane deflection of the upper and the lower portions of the body member;
2. Out-of-plane deflection of the upper and the lower portions of the body member;
3. Torsional deformation in the transverse portion of the body member.

Figure 8:
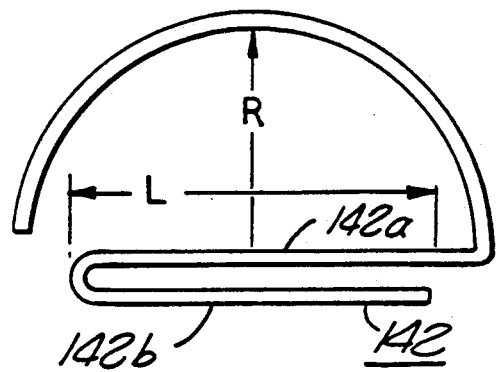
FIG. 8 is a semi-schematic diagrammatic representation of a generalized configuration of the present invention.

FIG. 8 is a diagrammatic representation of an upper portion generally designated 140 of a body member similar to the body member 72, shown in FIG. 3. However, as shown in FIG. 8, the upper portion is generally semicircular in shape, but the transverse portion 142 is comprised of a U-shaped member having two torsion sections 142a and 142b. The following analysis is based upon an analysis of the characteristics of a structure as illustrated in FIG. 8.

Figure 9:
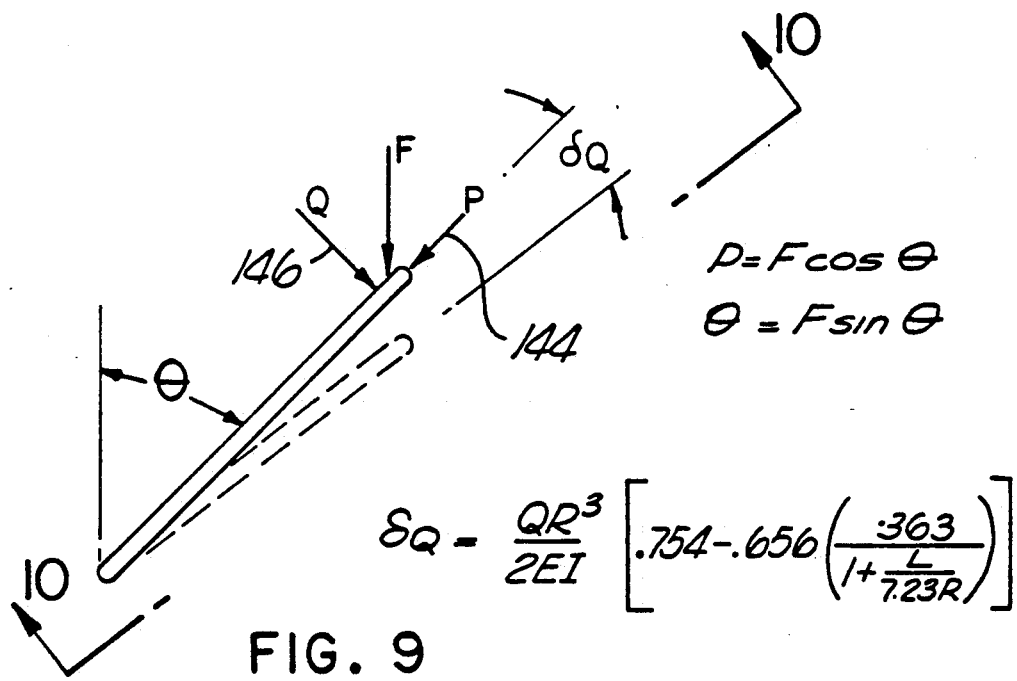
FIG. 9 is a semi-schematic diagrammatic representation of the structure shown in FIG. 8, and shows the relationship between the various characteristics of the present invention.

FIG. 9 is a side view of the structure illustrated in FIG. 8, and, as shown thereon, if such a structure is subjected to a force F, such force F may be considered to be comprised of force P acting on the upper portion 140 in a direction indicated by the arrow 144 in the plane thereof and a force Q illustrated by the arrow 146 acting perpendicularly thereto. The vector sum of P and Q is equal to F. The out-of-plane deflection $\delta_Q$ is shown in FIG. 9, and is the deflection caused by rotation from the initial angle $\theta$ to the position shown by the dotted line portion in FIG. 9, caused by the component force Q. In the analysis, as shown on FIG. 8, the letter R refers to a dimension approximately equal to the radius of the semi-circular configuration of the upper portion 140 and L represents the length of each of the two transverse sections 142a and 142b. It has been found that the deflection $\delta_Q$ is defined by the equation shown in FIG. 9.

The relationship between P, Q, F, and $\theta$, is also shown in FIG. 9.

Figure 10:
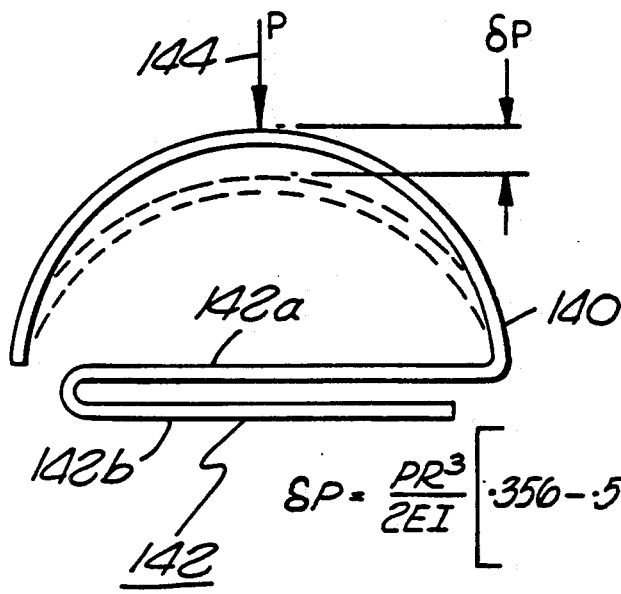
FIG. 10 is a semi-schematic diagrammatic representation of the structure shown in FIG. 8, and shows the relationship between other characteristics of the present invention.

FIG. 10 is a view of the arrangement shown in FIG. 9, taken along the view line 10—10. FIG. 10 illustrates a deflection $\delta_P$, and it has been found that this in-plane deflection $\delta_P$ is equal to the value shown on FIG. 10.

In FIG. 11, there is shown the relationship between the force F and the torsional deflection in the transverse portion 142. The force F is, of course, related to the change in the angle as illustrated, between the solid line and dotted line portions of FIG. 9, and this relationship is shown in FIG. 11. In the equations of FIG. 11, $\theta_0$ is the initial position of the upper body portion 140 and $\theta$ is the angle through which it has moved, both $\theta$ and $\theta_0$ being measured from a fixed reference.

These equations, shown in FIGS. 9, 10, and 11, may be solved, for example, by an iteration process to obtain the force-deflection relationship. FIG. 12 is a listing of the explanation of the various symbols utilized in the equations presented in the drawing. It has been found that $\delta_P$ and $\delta_Q$ are comparatively small compared to the effects of the torsion given by the equation of FIG. 11.

Figure 13:
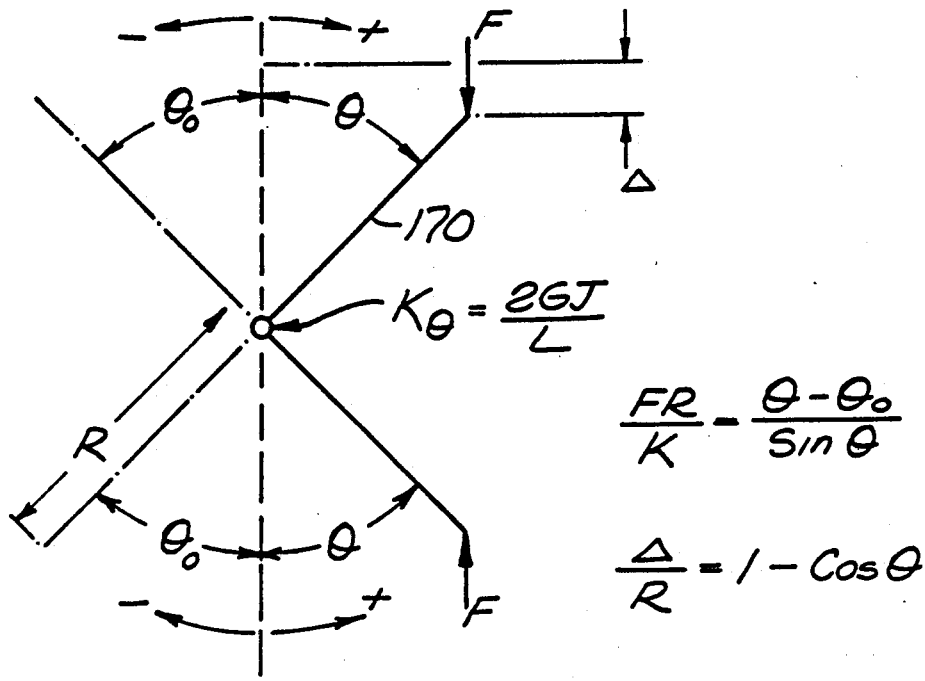
FIG. 13 is a diagrammatic representation of a generalized form of the present invention, and includes a tabular listing of the various characteristics of the present invention.
Figure 14:
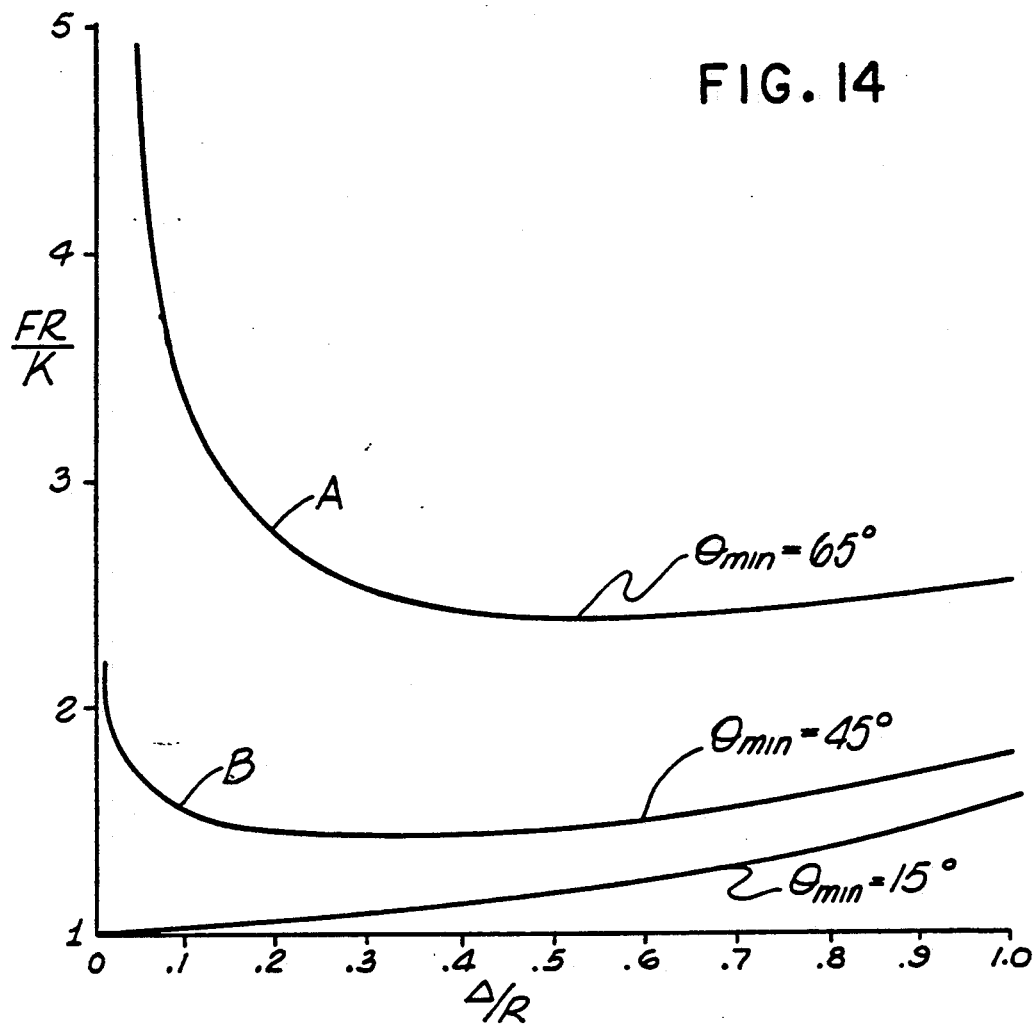
FIG. 14 is a graphical representation of certain of the characteristics shown in the tabular material of FIG. 13.

The table of FIG. 13 shows the relationship in dimensionless units between the initial position, installed position, the dimension R for various deflections, for a structure such as that illustrated in FIGS. 8, 9, and 10. The dashed line showing in FIG. 13 is the planar position. The dash-dot line showing is the initial position, and the solid line showing is the installed position. It will be appreciated that the angle $\theta$ indicating the installed position varies as the force F varies. The total deflection shown because of the insignificant contributions of the in-plane and out-of-plane deflections illustrated in FIGS. 9 and 10, is the deflection resulting from the torsion in the transverse portion under the application of a force F. The formulas relating the dimensionless parameters shown in the table of FIG. 13 are also shown on FIG. 13, and the meaning of the various symbols utilized are shown on the table of FIG. 12. As shown in the table of FIG. 13, $\theta_0$ represents the initial position illustrated in dash-dot lines in the schematic drawing on FIG. 13 of the body member 170. FIG. 14 is a plot of the relationships shown in the table of FIG. 13 of $$\frac{FR}{K} \text{ versus } \frac{\Delta}{R}$$

for three different initial positions, that is, curve A of FIG. 14 shows the values as listed in the column where the initial position was $-57.88°$, with the minus sign indicated in the drawing of FIG. 13. Curve B is the plot of the column where the initial position was $-12.3°$ and curve C is the column where the initial position was $-0.35°$.

From the relationship shown in FIG. 13, and as illustrated in FIG. 14, it can be seen that for any desired configuration, virtually any force-deflection relationship can be selected according to the principles of the present invention.

Figure 15:
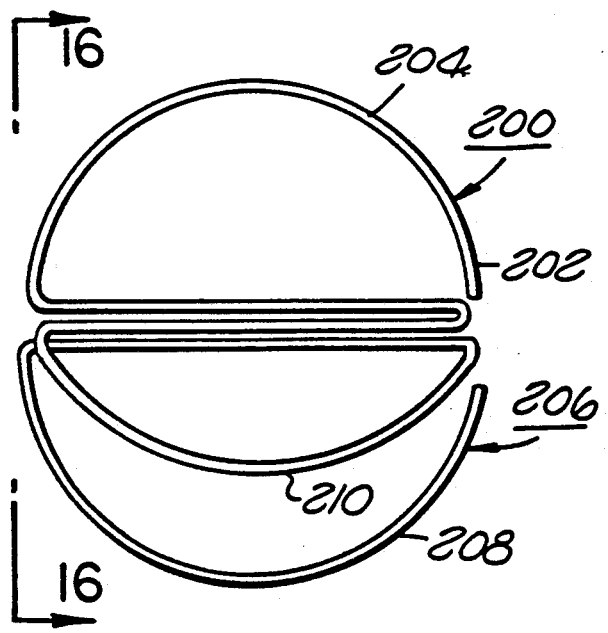
FIG. 15 is a semi-schematic, diagrammatic representation of another embodiment of the present invention.
Figure 16:
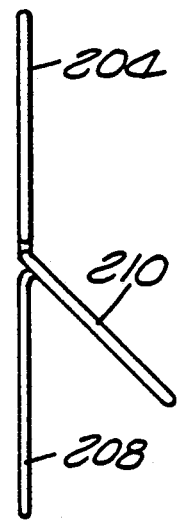
FIG. 16 is a view along the line 16—16 of FIG. 15.

FIGS. 15 and 16 illustrate another embodiment of the present invention. As shown in FIGS. 15 and 16, the embodiment 200 comprises a wire-like body member 202 having an upper portion 204. In the embodiment 200, however, the lower portion 206 has two segments 208 and 210. In the embodiment 200, the segment 208 is not co-planar with the segment 210. The transverse portion 212 closes the preselected open configuration of the upper portion 204. It will be appreciated, in accordance with the principles of the present invention, that arrangements similar to the embodiment 200 may be provided wherein any number of upper and/or lower segments may be provided as part of the upper portion and the lower portion.

This concludes the description of the embodiments of the present invention. Those skilled in the art can easily determine the particular diameters and relationship between the various positions for a given configuration in order to obtain any desired force-deflection characteristics. Accordingly, the appended claims are intended to cover all variations and adaptations of the present invention falling within the true scope and spirit thereof.

What is claimed is:

1. A resilient torsion arrangement, comprising, in combination:
    a wire-like body member having a first end, a second end, and an elongated length between said first end and said second end thereof, and formed to define:
        an upper portion having a first predetermined open geometrical configuration;
        a transverse portion extending across said first predetermined open geometrical configuration;

a lower portion having a second predetermined open geometrical configuration;

said upper portion resiliently movable toward said lower portion to put said transverse portion into torsion; and said first end and said second end of said body member are restrained at a preselected spaced-apart location on said transverse portion.

2. The arrangement defined in claim 1, and further comprising:

means for restraining each of said first and said second ends of said body portion in said spaced-apart location on said transverse portion.

3. A resilient torsion arrangement, comprising, in combination:

a wire-like body member having a first end, a second end, and an elongated length between said first end and said second end thereof, and formed to define:

an upper portion having a first predetermined open geometrical configuration;

a transverse portion extending across said first predetermined open geometrical configuration;

a lower portion having a second predetermined open geometrical configuration;

said upper portion resiliently movable toward said lower portion to put said transverse portion into torsion; and said body member has a planar position, wherein said upper portion, said transverse portion, and said lower portion, are substantially co-planar;

said body member is formed to have an initial position substantially free of torsional stress in said transverse portion, and said initial position is other than said planar position; and said upper portion rotates about said transverse portion to provide said resilient movement of said upper portion toward said lower portion.

4. The arrangement defined in claim 3, wherein:

said initial position comprises a position wherein said upper portion is a first predetermined number of degrees from said planar position in a first direction therefrom.

5. The arrangement defined in claim 4, and further comprising:

a flexible tubular member, having inner wall surfaces and outer wall surfaces, and said body member positioned within said flexible tubular member;

said upper portion and said lower portion of said body member adjacent said inner wall surfaces of said tubular member; and restraining means for restraining said body member within said tubular member;

and said body member having an installed position for the condition of said body member installed in said tubular member, and said upper portion of said body member is a second predetermined number of degrees from said planar position in a second direction therefrom, opposite said first direction.

6. The arrangement defined in claim 5, wherein:

said first predetermined number of degrees and said second predetermined number of degrees are selected to provide a predetermined relationship between a force applied to said outer surface of said tubular member and the separation between said upper portion and said lower portion of said body member.

7. The arrangement defined in claim 3, and further comprising:

a flexible tubular member, having inner wall surfaces and outer wall surfaces, and said body member positioned within said flexible tubular member;

said upper portion and said lower portion of said body member adjacent said inner wall surfaces of said tubular member; and restraining means for restraining said body member within said tubular member.

8. A resilient torsion arrangement, comprising, in combination:

a wire-like body member having a first end, a second end, and an elongated length between said first end and said second end thereof, and formed to define:

an upper portion having a first predetermined open geometrical configuration;

a U-shaped transverse portion extending across said first predetermined open geometrical configuration;

a lower portion having a second predetermined open geometrical configuration;

said upper portion resiliently movable toward said lower portion to put said transverse portion into torsion;

said upper portion rotates about said transverse portion to provide said resilient movement of said upper portion toward said lower portion; and said body member has a planar position wherein said upper portion, said transverse portion, and said lower portion are substantially co-planar; and said body member is formed to have an initial position substantially free of torsional stress in said transverse portion, and said initial position is other than the said planar position.

9. A resilient torsion arrangement, comprising, in combination:

a wire-like body member having a first end, a second end, and an elongated length between said first end and said second end thereof, and formed to define:

an upper portion having a first predetermined open geometrical configuration;

a transverse portion extending across said first predetermined open geometrical configuration;

a lower portion having a second predetermined open geometrical configuration;

said upper portion resiliently movable toward said lower portion to put said transverse portion into torsion; and said body member comprises a first body section and a second body section, each of said first and second body sections having a first end and a second end;

said first ends of said first and second body sections are coupled together in said upper portion; and said second ends of said first and second body sections are coupled together in said lower portion.

10. The arrangement defined in claim 9, wherein:

said transverse portion comprises a pair of U-shaped portions.

11. The arrangement defined in claim 10, wherein:

the closed ends of said pair of U-shaped portions are oppositely disposed.

12. The arrangement defined in claim 11, wherein:

the first of said pair of U-shaped portions is formed by said first section of said body member, and the second of said pair of U-shaped portions is formed by said second section of said body member.

13. The arrangement defined in claim 12, wherein said transverse portion extends across said second predetermined open geometrical configuration of said lower portion of said body member.

14. The arrangement defined in claim 13, wherein:
said upper portion rotates about said transverse portion to provide said resilient movement of said upper portion toward said lower portion.

15. The arrangement defined in claim 14, wherein:
said body member has a planar position, wherein said upper portion, said transverse portion, and said lower portion, are substantially co-planar;
said body member is formed to have an initial position substantially free of torsional stress in said transverse portion, and said initial position is other than said planar position.

16. The arrangement defined in claim 15, wherein:
said initial position comprises a position wherein said upper portion is a first predetermined number of degrees from said planar position in a first direction therefrom.

17. The arrangement defined in claim 16, and further comprising a tubelike means enclosing said transverse portion of said body member for restraining said pair of U-shaped portions in regions adjacent each other.

18. The arrangement defined in claim 9, and further comprising:
a flexible tubular member, having inner wall surfaces and outer wall surfaces, and said body member positioned within said flexible tubular member;
said upper portion and said lower portion of said body member adjacent said inner wall surfaces of said tubular member; and
restraining means for restraining said body member within said tubular member.

19. The arrangement defined in claim 18, wherein said transverse portion comprises a pair of U-shaped portions.

20. The arrangement defined in claim 19, wherein:
the closed ends of said pair of U-shaped portions are oppositely disposed.

21. The arrangement defined in claim 20, wherein:
the first of said pair of U-shaped portions is formed by said first section of said body member, and the second of said pair of U-shaped portions is formed by said second section of said body member.

22. The arrangement defined in claim 21, wherein:
said transverse portion extends across said second predetermined geometrical configuration of said lower portion of said body member.

23. The arrangement defined in claim 22, wherein:
said upper portion rotates about said transverse portion to provide said resilient movement of said upper portion toward said lower portion.

24. The arrangement defined in claim 23, wherein:
said body member has a planar position, wherein said upper portion, said transverse portion, and said lower portion, are substantially co-planar;
said body member is formed to have an initial position substantially free of torsional stress in said transverse portion, and said initial position is other than said planar position.

25. The arrangement defined in claim 24, wherein:
said initial position comprises a position wherein said upper portion is a first predetermined number of degrees from said planar position in a first direction therefrom.

26. The arrangement defined in claim 25, and further comprising a tubelike means enclosing said transverse portion of said body member for restraining said pair of U-shaped portions in regions adjacent each other.

27. The arrangement defined in claim 25, wherein:
said body member has an installed position for the condition of said body member installed in said tubular member, and said upper portion of said body member is a second predetermined number of degrees from said planar position in a second direction therefrom, opposite said first direction.

28. The arrangement defined in claim 27, wherein:
said first predetermined number of degrees and said second predetermined number of degrees are selected to provide a predetermined relationship between a force applied to said outer surface of said tubular member and the separation between said upper portion and said lower portion of said body member.

29. A resilient torsion arrangement, comprising, in combination:
a wire-like body member having a first end, a second end, and an elongated length between said first end and said second end thereof, and formed to define:
an upper portion having a first predetermined open geometrical configuration;
a transverse portion extending across said first predetermined open geometrical configuration;
a lower portion having a second predetermined open geometrical configuration;
said upper portion resiliently movable toward said lower portion to put said transverse portion into torsion; and
a flexible tubular member, having inner wall surfaces and outer wall surfaces, and said body member positioned within said flexible tubular member;
said upper portion and said lower portion of said body member adjacent said inner wall surfaces of said tubular member; and
restraining means for restraining said body member within said tubular member.

30. A resilient torsion arrangement, comprising, in combination:
a wire-like body member having a first end, a second end, and an elongated length between said first end and said second end thereof, and formed to define:
an upper portion having a first predetermined open geometrical configuration;
a transverse portion extending across said first predetermined open geometrical configuration;
a lower portion having a second predetermined open geometrical configuration;
said second open predetermined configuration is substantially the same as said first predetermined open configuration;
said upper portion resiliently movable toward said lower portion to put said transverse portion into torsion; and
a flexible tubular member, having inner wall surfaces and outer wall surfaces, and said body member positioned within said flexible tubular member;
said upper portion and said lower portion of said body member adjacent said inner wall surfaces of said tubular member; and
restraining means for restraining said body member within said tubular member;
and said first and said second predetermined configurations are substantially semi-circular.

31. A resilient torsion arrangement, comprising, in combination:

a wire-like body member having a first end, a second end, and an elongated length between said first end and said second end thereof, and formed to define:
an upper portion having a first predetermined open geometrical configuration;
a transverse portion extending across said first predetermined open geometrical configuration;
a lower portion having a second predetermined open geometrical configuration different from said first predetermined open geometrical configuration;
said upper portion resiliently movable toward said lower portion to put said transverse portion into torsion; and
a flexible tubular member, having inner wall surfaces and outer wall surfaces, and said body member positioned within said flexible tubular member;
said upper portion and said lower portion of said body member adjacent said inner wall surfaces of said tubular member; and
restraining means for restraining said body member within said tubular member.

32. A resilient torsion arrangement, comprising, in combination:
a wire-like body member having a first end, a second end, and an elongated length between said first end and said second end thereof, and formed to define:
an upper portion having a first predetermined open geometrical configuration;
a transverse portion extending across said first predetermined open geometrical configuration;
a lower portion having a second predetermined open geometrical configuration;
said upper portion resiliently movable toward said lower portion to put said transverse portion into torsion; and
said transverse portion extends across said second predetermined open geometrical configuration of said lower portion;
a flexible tubular member, having inner wall surfaces and outer wall surfaces, and said body member positioned within said flexible tubular member;
said upper portion and said lower portion of said body member adjacent said inner wall surfaces of said tubular member; and
restraining means for restraining said body member within said tubular member.

* * * * *